US008400260B2

(12) United States Patent
Stephenson et al.

(10) Patent No.: US 8,400,260 B2
(45) Date of Patent: Mar. 19, 2013

(54) SYSTEM AND METHOD FOR SECURING AUTHORIZED ACCESS BY A MOBILE DATA DEVICE OF A DOCUMENT PROCESSING DEVICE

(75) Inventors: Ken Stephenson, San Clemente, CA (US); Marianne Kodimer, Huntington Beach, CA (US); Louis Ormond, Irvine, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 797 days.

(21) Appl. No.: 12/184,299

(22) Filed: Aug. 1, 2008

(65) Prior Publication Data

US 2010/0026448 A1 Feb. 4, 2010

(51) Int. Cl.
*G05B 19/00* (2006.01)
*G05B 23/00* (2006.01)
*G05B 11/01* (2006.01)
*G08B 5/22* (2006.01)
*G06F 3/12* (2006.01)
*G06K 15/00* (2006.01)
*H04L 9/32* (2006.01)
*H04W 24/00* (2009.01)
*H04W 4/00* (2009.01)

(52) U.S. Cl. ........ 340/5.2; 340/5.8; 340/5.86; 340/7.22; 340/12.4; 358/1.15; 358/1.14; 713/170; 455/456.2; 455/466

(58) Field of Classification Search .................. 340/5.2, 340/5.22, 10.1, 572.1, 825.17; 358/1.15; 710/8, 9, 52–62; 455/507, 517
See application file for complete search history.

(56) References Cited

U.S. PATENT DOCUMENTS

| | | | | |
|---|---|---|---|---|
| 6,484,934 | B2* | 11/2002 | Salgado | 235/375 |
| 2002/0049729 | A1* | 4/2002 | Umekawa | 707/1 |
| 2005/0203805 | A1* | 9/2005 | Clough et al. | 705/26 |
| 2005/0273403 | A1* | 12/2005 | Nguyen et al. | 705/30 |
| 2006/0200735 | A1* | 9/2006 | Ormond | 715/500 |
| 2007/0016537 | A1* | 1/2007 | Singh et al. | 705/400 |
| 2008/0174805 | A1* | 7/2008 | Wang et al. | 358/1.15 |
| 2008/0184251 | A1* | 7/2008 | Shahindoust et al. | 718/104 |

* cited by examiner

*Primary Examiner* — Jennifer Mehmood
*Assistant Examiner* — Mirza Alam
(74) *Attorney, Agent, or Firm* — SoCal IP Law Group LLP; Steven C. Sereboff; Jonathan P. Pearce

(57) ABSTRACT

The subject application is directed to securing authorized access to a document processing device. Address information data associated with each mobile data device is first stored in a data storage. An incoming data message is received from a first mobile data device having identifier data assigned to the mobile device. The identifier data is then compared to stored address data and operation of a document processing device is selectively enabled via a user interface associated with the processing device according to an indication that identifier data corresponding to the received data is present in the storage. Electronic document data corresponding to an electronic document is received into the document processing device. Instruction data associated with a document processing operation is then received via the interface. Confirmation data is sent to the mobile device confirming the desired document processing operation. The desired operation is then commenced on the electronic document data.

12 Claims, 6 Drawing Sheets

SYSTEM AND METHOD FOR SECURING AUTHORIZED ACCESS BY A MOBILE DATA DEVICE OF A DOCUMENT PROCESSING DEVICE

BACKGROUND OF THE INVENTION

The subject application is directed generally to secure control of document processing operations. The application is particularly applicable to secure operation of shared document processing devices by use of mobile data devices that are readily available to users of such document processing systems.

Document processing devices are in widespread use, and include functionality such as copying, printing, scanning and facsimile transmission. Document processing devices which have more than one of these functions are frequently referred to as multifunction peripherals (MFPs) or multifunction devices (MFDs). There is considerable expense of purchasing and maintaining document processing devices. Also, given the size and weight of such devices as compared to portable data devices, such as cell phones, personal digital assistants (PDAs) or lightweight computers, users will often use sharable document processing device resources.

Shared document processing devices may be located in a business establishment for use by employees. Alternatively, such devices may be available at stores supplying document processing services. More recently, kiosks, such as self service kiosks, are becoming increasingly popular in public places such as airports, hotels, convenience stores, convention centers, or any other suitable location. Ubiquitous presence of document processing devices allows mobile users a useful way to secure processing of electronic documents.

Many shared document processing devices rely on a valid user ID and password to be entered in a user interface associated with the device prior to operation. In some instances, such information is used for assessing charges for document processing operations performed. Other systems require entry of payment information, such as a credit card number, debit card number, or data corresponding to a prepaid account, prior to completion of document processing operations. Still other systems track a user ID or password to allow for charge to be assessed against a particular department, individual or firm.

Many users have too many user IDs or passwords to recall given the many data devices which implement them, including computers, ATMs, locks, secure website logins, and the like. Often users will not recall login data due to the number of such instances that must be remembered. Additionally, if a user tries to establish a uniform login among various locations, they may find that a new location lists login information as already taken or as not complying with standards set for that location. Additionally, traditional login is dangerous insofar is a user may be watched by others as they enter their information, or a user may be tempted to write down login information to avoid forgetting it, leaving the written document open to possible compromise.

SUMMARY OF THE INVENTION

In accordance with one embodiment of the subject application, there is provided a system and method for secure control of document processing operations.

Further, in accordance with one embodiment of the subject application there is provided a system and method for secure operation of shared document processing devices by use of mobile data devices that are readily available to users of document processing systems.

Still further, in accordance with one embodiment of the subject application, there is provided a system and method for securing authorized access to a document processing device. Address data comprised of address information associated with each of a plurality of mobile data devices is stored in a data storage. An incoming data message is received from a first mobile data device, which incoming data message includes identifier data assigned to the first mobile data device and the identifier data is compared to stored address data. Operation of a document processing device is enabled via a user interface associated with the document processing device when an output of the comparison indicates that identifier data is present in the data storage which corresponds to received identifier data. Electronic document data is received into the document processing device corresponding to at least one electronic document as well as instruction data associated with at least one desired document processing operation. Confirmation data corresponding to a confirmation of the desired document processing operation is sent to the first mobile data device and the at least one desired document processing operation is commenced on the electronic document data via the document processing device.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for remote secure control of document processing operations.

In particular, the subject application is directed to a system and method for secure operation of shared document processing devices by use of mobile data devices that are readily available to users of such document processing systems. More particularly, the subject application is directed to a system and method for securing authorized access to a document processing device. It will become apparent to those skilled in the art that the system and method described herein are suitably adapted to a plurality of varying electronic fields employing secure access, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
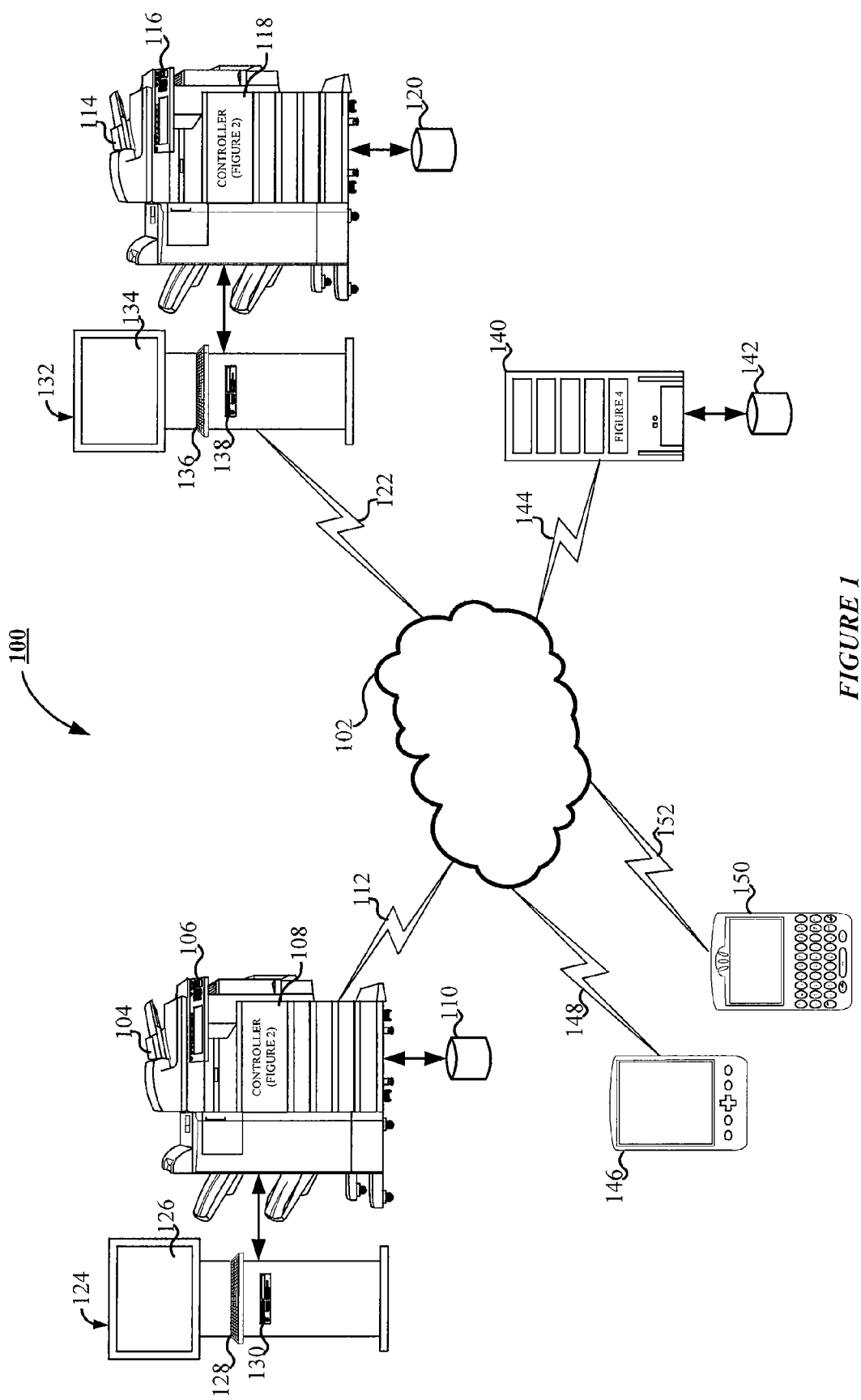
FIG. 1 is an overall diagram of a system for securing authorized access to a document processing device according to one embodiment of the subject application.

Referring now to FIG. 1, there is shown an overall diagram of a system 100 for securing authorized access to a document processing device in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes one or more document processing devices, depicted in FIG. 1 as the document processing devices 104, 114, and 124. As shown in FIG. 1, the document processing devices 104 and 114 are illustrated as multifunction peripheral devices, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing devices 104 and 114 are suitably adapted to provide remote document processing services to external or network devices. Preferably, the document processing devices 104 and 114 include hardware, software, and any suitable combination thereof, configured to interact with an associated user, a networked device, or the like.

According to one embodiment of the subject application, the document processing devices 104 and 114 are suitably equipped to receive a plurality of portable storage media, including, without limitation, Firewire drive, USB drive, SD, MMC, XD, Compact Flash, Memory Stick, and the like. In the preferred embodiment of the subject application, the document processing devices 104 and 114 further include associated user interfaces 106 and 116, such as a touch-screen, LCD display, touch-panel, alpha-numeric keypad, or the like, via which an associated user is able to interact directly with the document processing devices 104 and 114. In accordance with the preferred embodiment of the subject application, the user interfaces 106 and 116 are advantageously used to communicate information to associated users and receive selections from such associated users.

The skilled artisan will appreciate that the user interfaces 106 and 116 comprise various components, suitably adapted to present data to associated users, as are known in the art. In accordance with one embodiment of the subject application, the user interfaces 106 and 116 comprise a display, suitably adapted to display one or more graphical elements, text data, images, or the like, to an associated user, receive input from the associated user, and communicate the same to a backend component, such as controllers 108 and 118, as explained in greater detail below. Preferably, the document processing devices 104 and 114 are communicatively coupled to the computer network 102 via suitable communications links 112 and 122. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing devices 104 and 114 further incorporate a backend component, designated as the controllers 108 and 118, suitably adapted to facilitate the operations of their respective document processing devices 104 and 114, as will be understood by those skilled in the art. Preferably, the controllers 108 and 118 are embodied as hardware, software, or any suitable combination thereof, configured to control the operations of the associated document processing devices 104 and 114, facilitate the display of images via the user interfaces 106 and 116, direct the manipulation of electronic image data, and the like. For purposes of explanation, the controllers 108 and 118 are used to refer to any myriad of components associated with the document processing devices 104 and 114, including hardware, software, or combinations thereof, functioning to perform, cause to be performed, control, or otherwise direct the methodologies described hereinafter. It will be understood by those skilled in the art that the methodologies described with respect to the controllers 108 and 118 are capable of being performed by any general purpose computing system, known in the art, and thus the controllers 108 and 118 are representative of such a general computing device and is intended as such when used hereinafter. Furthermore, the use of the controllers 108 and 118 hereinafter is for the example embodiment only, and other embodiments, which will be apparent to one skilled in the art, are capable of employing the system and method for securing authorized access to a document processing device of the subject application. The functioning of the controllers 108 and 118 will better be understood in conjunction with the block diagrams illustrated in FIGS. 2 and 3, explained in greater detail below.

Communicatively coupled to the document processing devices 104 and 114 are data storage devices 110 and 120. In accordance with the preferred embodiment of the subject application, the data storage devices 110 and 120 are any mass storage device known in the art including, for example and without limitation, magnetic storage drives, a hard disk drive, optical storage devices, flash memory devices, or any suitable combination thereof. In the preferred embodiment, the data storage devices 110 and 120 are suitably adapted to store document data, image data, electronic database data, or the like. It will be appreciated by those skilled in the art that while illustrated in FIG. 1 as being a separate component of the system 100, the data storage devices 110 and 120 are capable of being implemented as internal storage components of the document processing devices 104 and 114, components of the controllers 108 and 118, or the like, such as, for example and without limitation, an internal hard disk drive, or the like.

Illustrated in FIG. 1 are a first kiosk 124, communicatively coupled to the first document processing device 104, and in effect, the computer network 102, and a second kiosk 132, communicatively coupled to the second document processing device 114, and in effect, the computer network 102. It will be appreciated by those skilled in the art that the kiosks 124 and 132 are capable of being implemented as separate components of the respective document processing devices 104 and 114, or as integral components thereof. Use of the kiosks 124 and 132 in FIG. 1 are for example purposes only, and the skilled artisan will appreciate that the subject application is capable of implementation without the use of kiosks 124 and 132. In accordance with one embodiment of the subject application, the kiosks 124 and 132 include respective displays 126 and 134 and user input devices 128 and 136. As will be understood by those skilled in the art the kiosks 124 and 132 are capable of implementing a combination user input device/display, such as a touch screen interface. According to one embodiment of the subject application, the kiosks 124 and 132 are suitably adapted to display selected advertisements to prospective customers, prompts to an associated user, receive instructions from the associated user, receive payment data, receive selection data from the associated user, and the like. Preferably, the kiosks 124 and 132 include a magnetic card reader, conventional bar code reader, or the like, suitably adapted to receive and read payment data from a credit card, coupon, debit card, or the like.

The system 100 of FIG. 1 also includes portable storage device readers 130 and 138, coupled to the kiosks 124 and 132 and suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

The system 100 illustrated in FIG. 1 further depicts a backend server 140 suitably adapted to communicate data to the document processing devices 104 and 114, facilitate receipt of payment data, temporarily store job data, maintain user identification/account information, and the like. Preferably, the server 140 is communicatively coupled to the computer network 102 via a suitable communications link 144. It will be appreciated by those skilled in the art that the server 144 comprises hardware, software, and combinations thereof suitably adapted to provide one or more services, web-base applications, storage options, and the like, to networked devices. In accordance with one embodiment of the subject application, the server 140 includes various components, implemented as hardware, software, or a combination thereof, for managing the retention of electronic data, performing searches, storing advertisements, storing account information, storing billing information, retrieval of documents, and the like, which are accessed via the computer network 102. The communications link 144 is any suitable data communications means known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. It will be appreciated by those skilled in the art that the components described with respect to the server 140 hereinafter are capable of implementation on any computing device coupled to the computer network 102 and functioning as a backend server. The functioning of the server 140 will better be understood in conjunction with the block diagrams illustrated in FIG. 4, explained in greater detail below.

Communicatively coupled to the server 140 is the data storage device 142. In accordance with the preferred embodiment of the subject application, the data storage device 142 is any mass storage device, or plurality of such devices, known in the art including, for example and without limitation, magnetic storage drives, a hard disk drive, optical storage devices, flash memory devices, or any suitable combination thereof. In the example embodiment, the data storage device 142 is suitably adapted to store processing job data, location data, software updates, update lists, electronic database data, document data, image data, location data, advertisement data, account data, user data, and the like. It will be appreciated by those skilled in the art that while illustrated in FIG. 1 as being a separate component of the system 100, the data storage device 142 is capable of being implemented as an internal storage component of the server 140, or the like, such as, for example and without limitation, an internal hard disk drive, or the like.

The system 100 of FIG. 1 further includes one or more mobile data devices, depicted in FIG. 1 as the personal data assistant 146 and the smart phone 150, each of which is communicatively coupled to the computer network 102 via the respective communication links 148 and 152. The skilled artisan will appreciate that the mobile devices 146 and 150 are representative of any suitable portable computing device known in the art including, for example and without limitation, a laptop computer, a web-enabled cellular telephone, or other portable web-enabled device. The communications links 148 and 152 are any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. In accordance with one embodiment of the subject application, the mobile data devices 146 and 150 are suitably configured to communicate with the document processing devices 104 and 114, display and received document processing instructions to associated users, provide requested user identification data to requesting devices, store financial data, and the like.

Figure 2:
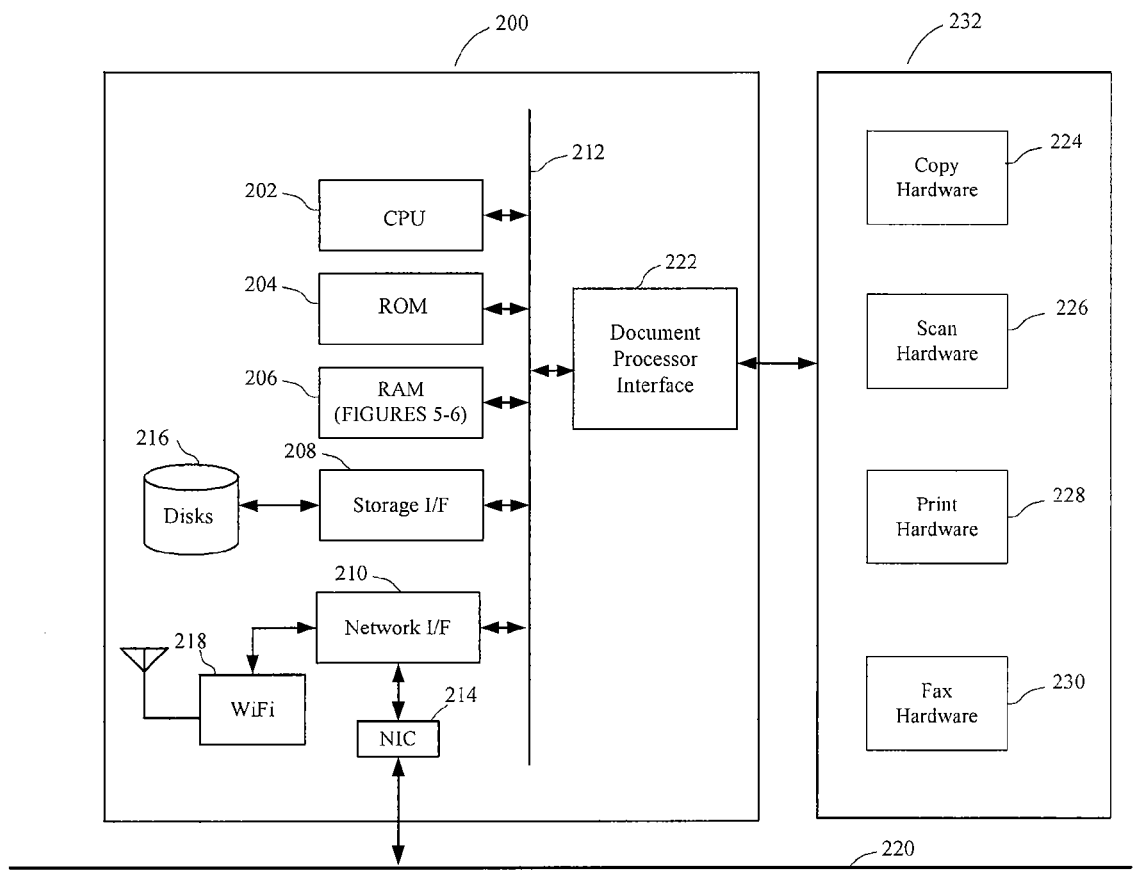
FIG. 2 is a block diagram illustrating controller hardware for securing authorized access to a document processing device according to one embodiment of the subject application.

Turning now to FIG. 2, illustrated is a representative architecture of a suitable backend component, i.e., the controller 200, shown in FIG. 1 as the controllers 108 and 118, on which operations of the subject system 100 are completed. The skilled artisan will understand that the controller 200 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by the bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
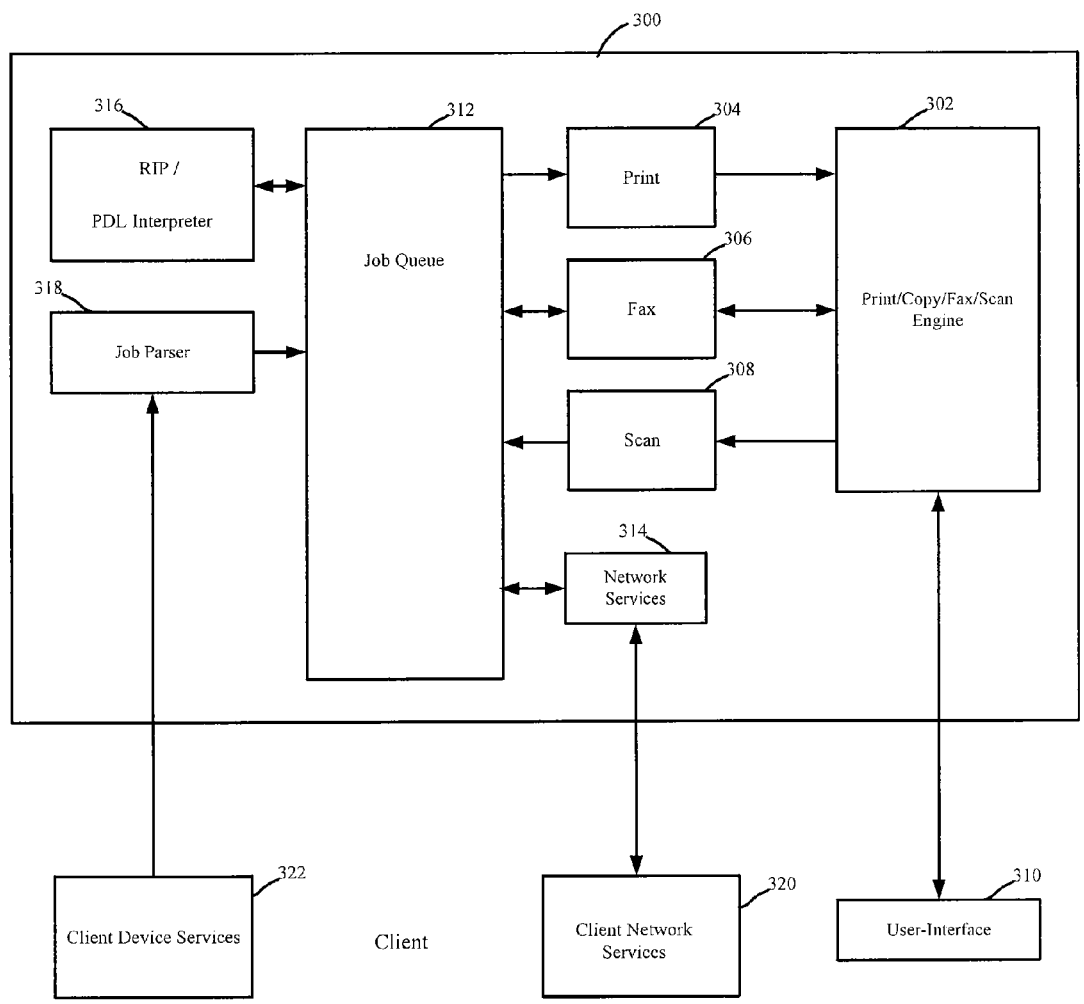
FIG. 3 is a functional diagram illustrating the controller for use in the system for securing authorized access to a document processing device according to one embodiment of the subject application.

Functionality of the subject system 100 is accomplished on a suitable document processing device, such as the document processing devices 104 and 114, which includes the controller 200 of FIG. 2, (shown in FIG. 1 as the controllers 108 and 118) as an intelligent subsystem associated with a document processing device. In the illustration of FIG. 3, controller function 300 in the preferred embodiment includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

Figure 4:
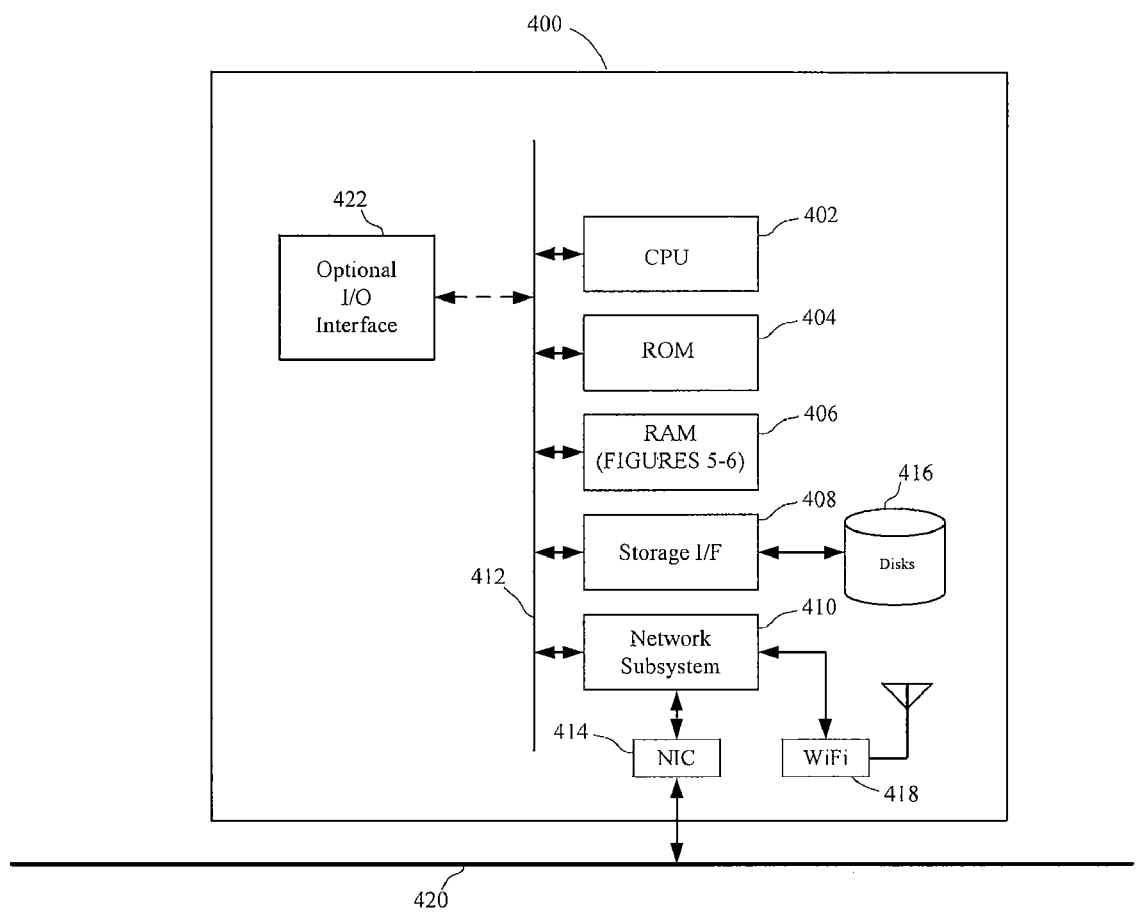
FIG. 4 is a diagram illustrating a workstation for use in the system for securing authorized access to a document processing device according to one embodiment of the subject application.

Turning now to FIG. 4, illustrated is a representative architecture of a suitable server 400, shown in FIG. 1 as the server 140, on which operations of the subject system are completed. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration, and other routines or data used for operation of the server 400.

Also included in the server 400 is random access memory 406, suitably formed of dynamic random access memory, static random access memory, or any other suitable, addressable memory system. Random access memory provides a storage area for data instructions associated with applications and data handling accomplished by the processor 402.

A storage interface 408 suitably provides a mechanism for volatile, bulk or long term storage of data associated with the server 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the server 400 to communicate to other devices. The network interface subsystem 410 suitably interfaces with one or more connections with external devices to the server 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network subsystem 410 is suitably accomplished via a bus data transfer mechanism, such as illustrated by bus 412.

Suitable executable instructions on the server 400 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 422 as will be appreciated by one of ordinary skill in the art.

In operation, address data comprised of address information associated with each of multiple mobile data devices is first stored in a data storage. An incoming data message is then received from a first mobile data device that includes identifier data assigned to the first mobile data device. The received identifier data is then compared to stored address data. Operation of a document processing device is then selectively enabled via a user interface associated with the document processing device based upon the output of the comparison indicating that the identifier data is present in the data storage which corresponds to the received identifier data. Electronic document data corresponding to at least one electronic document is then received into the document processing device. Via the user interface, instruction data is received associated with at least one document processing operation. Confirmation data is then sent to the first mobile device corresponding to a confirmation of the desired document processing operation. The desired document processing operation is then commenced on the electronic document data via the document processing device.

In accordance with one example embodiment of the subject application, address data is stored in association with each of multiple mobile data devices 146 and 150 on an associated data storage. According to one embodiment of the subject application, the server 140 stores the address data of each of a plurality of mobile data devices 146 and 150 on the associated data storage 142. In one particular embodiment, each of a plurality of document processing devices 104 and 114 store address data associated with each of the plurality of mobile data devices 146 and 150 via the respective data storage devices 110 and 120. The controller 108, 118 or other suitable component associated with a respective document processing device 104, 114 then receives an incoming data message from one of the mobile data devices 146 or 150 that includes identifier data assigned to the device 146 or 150 from which the message originates. Stated another way, the mobile data device 146 or 150 communicates a message to a selected document processing device 104 or 114 that includes the identifier data assigned to the mobile data device 146 or 150.

A comparison of the received identifier data is then made by the controller 108 or 118 or other suitable component associated with the selected document processing device 104 or 114 with that address data stored in the data storage 110, 120, or 142. According to one embodiment of the subject application the server 140 maintains a database on the data storage 142 including, for example and without limitation, document data, personal information, user account data, assigned address data for multiple devices, and the like. In such an embodiment, the server 142 facilitates the administration of document processing jobs submitted to each of the document processing device 104 or 114, monitors user accounts, facilitates payment for rendering services, and the like. Preferably, the controller 108, 118 or other suitable component associated with the selected document processing device 104 or 114 searches the associated data storage 110 or 120, or the data storage 142 so as to locate address data corresponding to the identifier data assigned to the mobile data device 146 or 150. In the event that the controller 108 or 110 is unable to locate address data corresponding to the received identifier data, the corresponding document processing device 104 or 114 is enabled for normal document processing operations, as will be appreciated by those skilled in the art.

Following a determination that address data matching the assigner data has been located, operations of the corresponding document processing device 104 or 114 are enabled via the user interface 106, 116, the kiosk 124, 132, the touch screen display 126, 134 or the like. For example purposes, reference is now made to the first document processing device 104, and associated components, performing the subject methodology. The document processing device 104 then receives electronic document data representative of at least one electronic document. It will be appreciated by those skilled in the art that such electronic document is capable of being received by the document processing device 104 via the interface 130 of the kiosk 124, via communication from the mobile data device 146 or 150, via portable storage media, via network storage, e.g. the server 140, or the like.

The controller 108 or other suitable component associated with the document processing device 104 then receives document processing operation instruction data from a user associated with the mobile data device 146 or 150 corresponding to instructions of a document processing operation to be performed on the electronic document data. The skilled artisan will appreciate that such instruction data is suitably received via the user interface 106, the touch screen display 126, the user input device 128, or the like. It will also be appreciated by those skilled in the art that such instruction data is capable of including, for example and without limitation, a type of document processing operation (copy, scan, facsimile, print, etc.), finishing options (n-up rendering, binding, stapling, hole-punching, collation, color rendering, stock selection), and the like. The controller 108 or other suitable component associated with the document processing device 104 then sends confirmation data corresponding to a confirmation of the desired document processing operation to the mobile data device 146 or 150.

Acceptance of the document processing operation in accordance with the received instruction data is then received by the controller 108 or other suitable component associated with the document processing device 104 from the mobile data device 146 or 150, or from the associated user via the user interface 106, the kiosk 124, or the like. In the event that the user does not desire to proceed with the selected document processing operation, the user is prompted to change the instructions. When no modifications to the instructions are received, operations terminate without processing the received electronic document data. Following receipt of modified instructions, and upon confirmation thereof, or following confirmation of the original instruction data, the controller 108 or other suitable component associated with the document processing device 104 calculates the cost corresponding to the performance of the selected document processing operation in accordance with the received processing instruction data.

Preferably, the calculated cost is then displayed to the associated user for approval. In the event that the user does not approve the calculated cost, the document processing device 104 ceases operations, thereby denying the requested document processing operation. Following receipt of approval of the calculated costs, e.g. via the user interface 106, the mobile device 146 or 150, the kiosk 124, or the like, the document processing device 104 commences the document processing operation on the received electronic document data in accordance with the received processing instructions. Thereafter, charges corresponding to the calculated cost are assessed to an associated account based upon the identifier data assigned to the mobile data device 146 or 150. That is, the controller 108 or other suitable component associated with the document processing device 104 assesses the cost of the document processing operation to an account of the user based upon the identifier data assigned to the mobile device 146 or 150 with which the user is associated. In accordance with one embodiment of the subject application, the charges are assessed by the server 140 against an account maintained on the data storage 142 associated with the mobile device 146 or 150 from which the user initiated the document processing operation.

Figure 5:
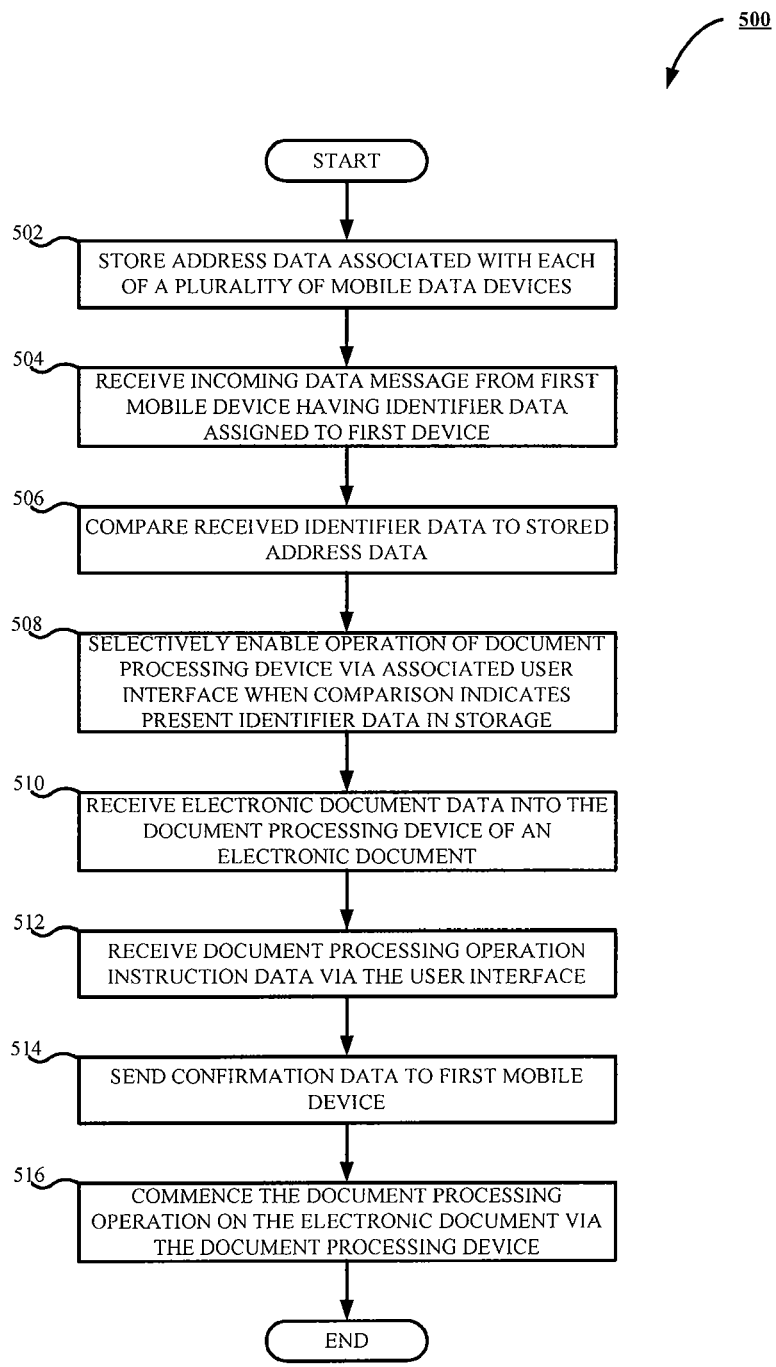
FIG. 5 is a flowchart illustrating a method for securing authorized access to a document processing device according to one embodiment of the subject application.

The skilled artisan will appreciate that the subject system 100 and components described above with respect to FIG. 1, FIG. 2, FIG. 3, and FIG. 4 will be better understood in conjunction with the methodologies described hereinafter with respect to FIG. 5 and FIG. 6. Turning now to FIG. 5, there is shown a flowchart 500 illustrating a method for securing authorized access to a document processing device in accordance with one embodiment of the subject application. Beginning at step 502, address data comprised of address information associated with each of a plurality of mobile data devices 146 and 150 is first stored in a data storage, e.g. the data storage device 110, the data storage device 120, the data storage device 142, or the like. According to one embodiment of the subject application, the address data is stored on the data storage device 142 associated with the server 140, which thereby makes such data suitably available to the document processing devices 104 and 114 via the computer network 102. In accordance with another embodiment of the subject application, each of the document processing devices 104 and 114, via the associated data storage 110 and 120, stores address data associated with the plurality of mobile data devices 146 and 150. The skilled artisan will appreciate that while reference is made hereinafter to the first document processing device 104 implementing portions of FIG. 5, any suitable document processing device coupled to the computer network 102 is equally capable of being used in such a manner and selection of the first document processing device 104 is for example purposes only.

At step 504, an incoming data message is received from a first mobile data device 146 that includes identifier data assigned to the first mobile data device 146. Suitable examples of such identifier data includes, for example and without limitation, a unique alpha-numeric code, username, device name, serial number, MAC address, or the like. The controller 108 or other suitable component associated with the document processing device 104 then compares the received identifier data with address data stored in the associated data storage 110 at step 506. In accordance with one embodiment of the subject application, the received identifier data is communicated from either the mobile data device 146 or controller 108 via the computer network 102 to the server 140 for comparison with address data stored thereon. In such an embodiment, the server 140 then returns comparison results to the controller 108 or other suitable component associated with the document processing device 104.

At step 508, the operation of the document processing device 104 is selectively enabled via a user interface 106, the kiosk 124, or the like, associated with the document processing device 104 based upon the output of the comparison indicating that the identifier data is present in the data storage 110 or 142 which corresponds to the received identifier data. The document processing device 104, via a suitable component associated therewith, then receives electronic document data corresponding to at least one electronic document at step 510. It will be appreciated by those skilled in the art that the electronic document data is capable of being received, for example and without limitation, from a portable storage medium, from the mobile device 146, from a network storage, from an electronic mail communication, from a web-site, or the like.

Instruction data is then received at step 512 via the user interface 106, the touch screen display 126, the user input device 128, or the like, associated with at least one document processing operation to be performed on the received electronic document data. Confirmation data is then sent to the mobile data device 146 at step 514 corresponding to the confirmation of the document processing operation of the received instruction data. Flow then proceeds to step 516, whereupon the document processing device 104 commences the document processing operation on the received electronic document data in accordance with the received instruction data.

Figure 6:
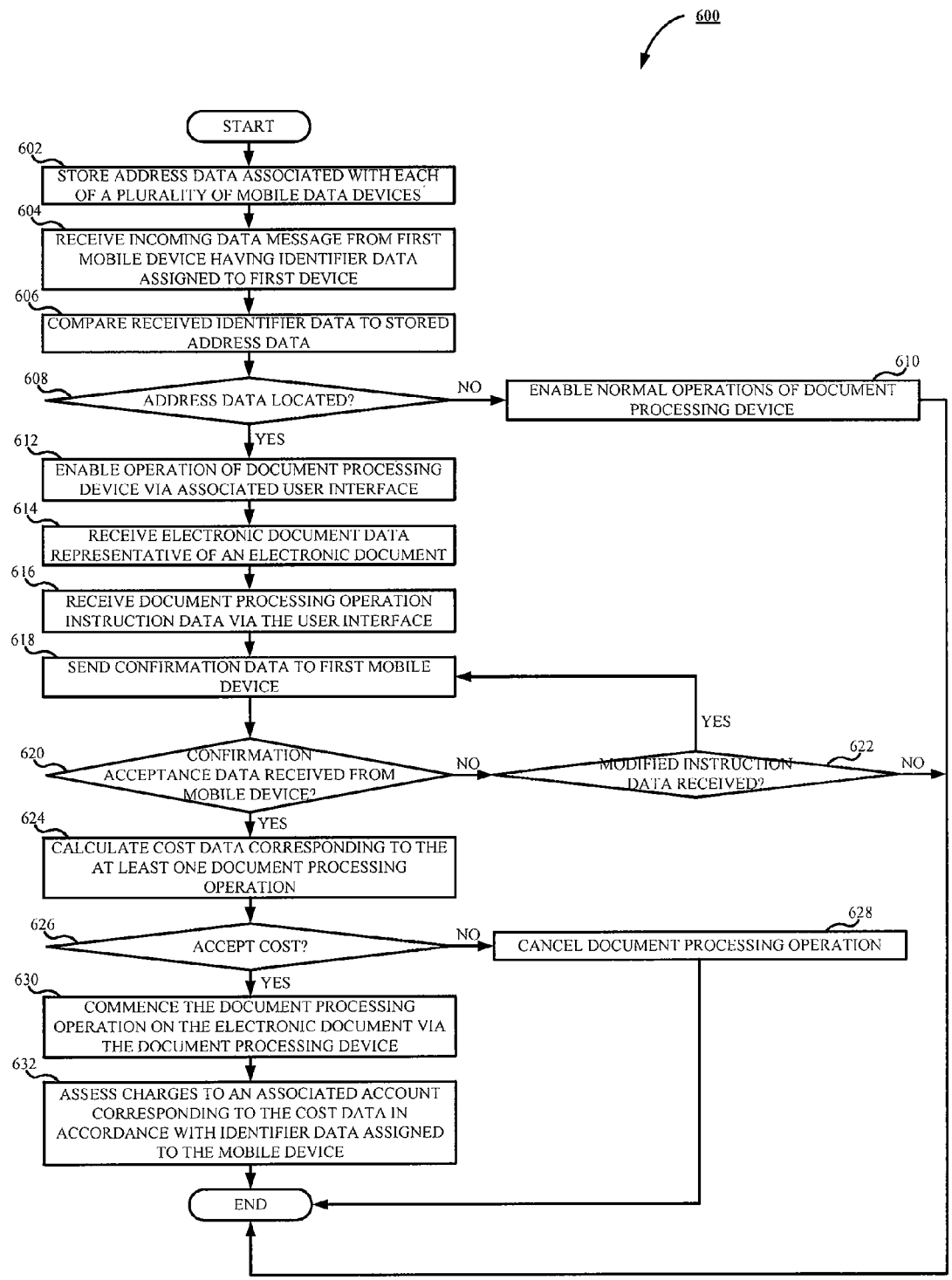
FIG. 6 is a flowchart illustrating a method for securing authorized access to a document processing device according to one embodiment of the subject application.

Referring now to FIG. 6, there is shown a flowchart 600 illustrating a method for securing authorized access to a document processing device in accordance with one embodiment of the subject application. For example purposes only, reference is made hereinafter to the computer first document processing device 104 being selected in accordance with the methodology set forth in FIG. 6. The skilled artisan will appreciate that any suitable document processing device 104 or 114 coupled to the computer network 102 is equally capable of being selected in accordance with the methodology of FIG. 6 and the following description is therefore only intended as an example illustration of such methodology. The method of FIG. 6 begins at step 602, whereupon address data is stored in association with each of a plurality of mobile data devices 146 and 150 on an associated data storage. In accordance with one embodiment of the subject application, the address data of each mobile data device 146 and 150 is stored on the server 140 in the associated data storage 142. According to one particular embodiment, each of a plurality of document processing devices 104 and 114 store address data associated with each of the mobile data devices 146 and 150 via their respective data storage devices 110 and 120.

At step 604, incoming message data is received by the controller 108 or other suitable component associated with a respective document processing device 104 from one of the mobile data devices 146 or 150. Preferably, the incoming message data includes, for example and without limitation, identifier data assigned to the device 146 or 150 from which the message originates. That is, the mobile data device 146 or 150 communicates a message to a selected document processing device 104 that includes the identifier data assigned to the mobile data device 146 or 150.

A comparison of the received identifier data is then made by the controller 108 or other suitable component associated with the selected document processing device 104 with that address data stored in the data storage 110 or 142 at step 606. According to one embodiment of the subject application the server 140 maintains a database on the data storage 142 including, for example and without limitation, document data, personal information, user account data, assigned address data for multiple devices, and the like. In such an embodiment, the server 142 facilitates the administration of document processing jobs submitted to each of the document processing device 104 or 114, monitors user accounts, facilitates payment for rendering services, and the like. Preferably, the controller 108 or other suitable component associated with the selected document processing device 104 searches the associated data storage 110 or 142 so as to locate address data corresponding to the identifier data assigned to the mobile data device 146 or 150.

A determination is then made at step 608 whether address data corresponding to the received identifier data has been located by the controller 108 or other suitable component associated with the selected document processing device 104. Upon a determination at step 608 that the controller 108 is unable to locate address data corresponding to the received identifier data, flow proceeds to step 610, whereupon the selected document processing device 104 is enabled for normal document processing operations, as will be appreciated by those skilled in the art.

When it is determined at step 608 that address data matching the assigned identifier data has been located, flow proceeds to step 612. At step 612, operations of the selected document processing device 104 are enabled via the user interface 106, the kiosk 124, the touch screen display 126, or the like. The document processing device 104 then receives electronic document data representative of at least one electronic document at step 614. The skilled artisan will appreciate that such electronic document is capable of being received by the document processing device 104 via the interface 130 of the kiosk 124, via communication from the mobile data device 146 or 150, via portable storage media, via network storage, e.g. the server 140, or the like. The controller 108 or other suitable component associated with the document processing device 104 then receives document processing operation instruction data from a user associated with the mobile data device 146 or 150 at step 616. In accordance with one embodiment of the subject application, the instruction data is representative of instructions for the performance of a document processing operation on the electronic document data. The skilled artisan will appreciate that such instruction data is suitably received via the user interface 106, the touch screen display 126, the user input device 128, or the like. Those skilled in the art will further appreciate that such instruction data is capable of including, for example and without limitation, a type of document processing operation (copy, scan, facsimile, print, etc.), finishing options (n-up rendering, binding, stapling, hole-punching, collation, color rendering, stock selection), and the like.

At step 618, the controller 108 or other suitable component associated with the document processing device 104 then sends confirmation data corresponding to a confirmation of the desired document processing operation to the mobile data device 146 or 150. A determination is then made at step 620 whether confirmation acceptance data has been received from the mobile data device 146 or 150. Suitable acceptance of the document processing operation in accordance with the received instruction data is capable of being received by the controller 108 or other suitable component associated with the document processing device 104 from the mobile data device 146 or 150, from the associated user via the user interface 106, the kiosk 124, or the like. Upon a determination at step 620 that confirmation acceptance data has not been received, flow proceeds to step 622, whereupon a determination is made whether modified instruction data has been received from the associated user via the user interface 106, the touch screen display 126, the user input device 128, or the like. Preferably, a graphical user interface is displayed to the associated user so as to prompt the user to either confirm acceptance of the document processing operation, provide modified instructions, or cancel operations with respect to FIG. 6.

Upon a determination that no modifications to the instructions are received, operations terminate without processing the received electronic document data. For example, the user is able to cancel operations with respect to FIG. 6 via selection of suitable indicia displayed on the user interface 106, the touch screen display 126, or the like. When modified instruction data is received, flow returns to step 618, whereupon confirmation data is sent to the mobile data device 146 or 150 for acceptance thereof by the associated user. Following receipt of modified instructions, and upon confirmation thereof, or following confirmation of the original instruction data, operations proceed to step 624. At step 624, the controller 108 or other suitable component associated with the document processing device 104 calculates the cost corresponding to the performance of the selected document processing operation in accordance with the received processing instruction data, i.e. either the original instructions or modified instructions.

In accordance with one embodiment of the subject application, the calculated cost is suitably displayed to the associated user for approval via the user interface 106, the touch screen display 126, the mobile device 146 or 150, or the like. A determination is then made at step 626 whether the user has approved the calculated costs. When it is determined at step 626 that the user does not approve the calculated cost, flow proceeds to step 628. At step 628, the document processing device 104 ceases operations with respect to FIG. 6, thereby denying the requested document processing operation.

Upon a determination at step 626 that acceptance of the calculated costs has been received, e.g. via the user interface 106, the mobile device 146 or 150, the kiosk 124, or the like, flow progresses to step 630. At step 630, the document processing device 104 commences the document processing operation on the received electronic document data in accordance with the received processing instructions. Charges corresponding to the calculated cost are then assessed to an associated account based upon the identifier data assigned to the mobile data device 146 or 150 at step 632. According to one embodiment of the subject application, the charges are assessed by the server 140 against an account maintained on the data storage 142 associated with the mobile device 146 or 150 from which the user initiated the document processing operation.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for securing authorized access for use of a document processing device comprising:
    a document processing device having an associated user interface;
    data storage means for storing address data comprised of address information associated with each of a plurality of mobile data devices;
    means for receiving an incoming data message from a first mobile data device of the plurality of mobile data devices, the incoming data message including identifier data assigned to the first mobile data device;
    comparison means for comparing the identifier data to the address data;
    means for selectively enabling operation of the document processing device when the comparison means indicates that the identifier data is present in the address data stored in the data storage means;
    means for receiving, into the document processing device, an electronic document;
    means for receiving instruction data associated with a desired document processing operation for the electronic document;
    means for sending a confirmation of commencement of the desired document processing operation to the first mobile data device; and
    document operation means for commencing the desired document processing operation on the electronic document using the document processing device.

2. The system of claim 1 further comprising means for receiving a confirmation acceptance from the first mobile data device; and
    wherein the document operation means commences the desired document processing operation upon receipt of confirmation acceptance from the first mobile data device.

3. The system of claim 2 further comprising means for calculating cost data corresponding to the at least one document processing operation.

4. The system of claim 3 wherein the confirmation includes calculated cost data.

5. The system of claim 4 further comprising means for assessing charges to an account associated with the first mobile data device upon completion of the document processing operation by the document processing device.

6. The system of claim 5 wherein the charges are assessed to the account identified by the identifier data assigned to the first mobile data device.

7. A method for securing authorized access for use of a document processing device comprising:
    storing address data comprised of address information associated with each of a plurality of mobile data devices in a data storage;
    receiving an incoming data message from a first mobile data device of the plurality of mobile data devices, the incoming data message including identifier data assigned to the first mobile data device;
    comparing the identifier data to the address data;
    selectively enabling operation of a document processing device the comparison indicates that the identifier data is present in the address data stored in the data storage;
    receiving, into the document processing device, an electronic document;
    receiving instruction data associated with a desired document processing operation for the electronic document;
    sending a confirmation of commencement of the desired document processing operation to the first mobile data device; and
    commencing the desired document processing operation on the electronic document data using the document processing device.

8. The method of claim 7 further comprising receiving a confirmation acceptance from the first mobile data device; and wherein the desired document processing operation is commenced upon receipt of confirmation acceptance from the first mobile data device.

9. The method of claim 8 further comprising calculating cost data corresponding to the at least one document processing operation.

10. The method of claim 9 wherein the confirmation includes calculated cost data.

11. The method of claim 10 further comprising assessing charges to an account associated with the first mobile data device upon completion of the document processing operation by the document processing device.

12. The method of claim 11 wherein the charges are assessed to the account identified by the identifier data assigned to the first mobile data device.

* * * * *